Figure 1:
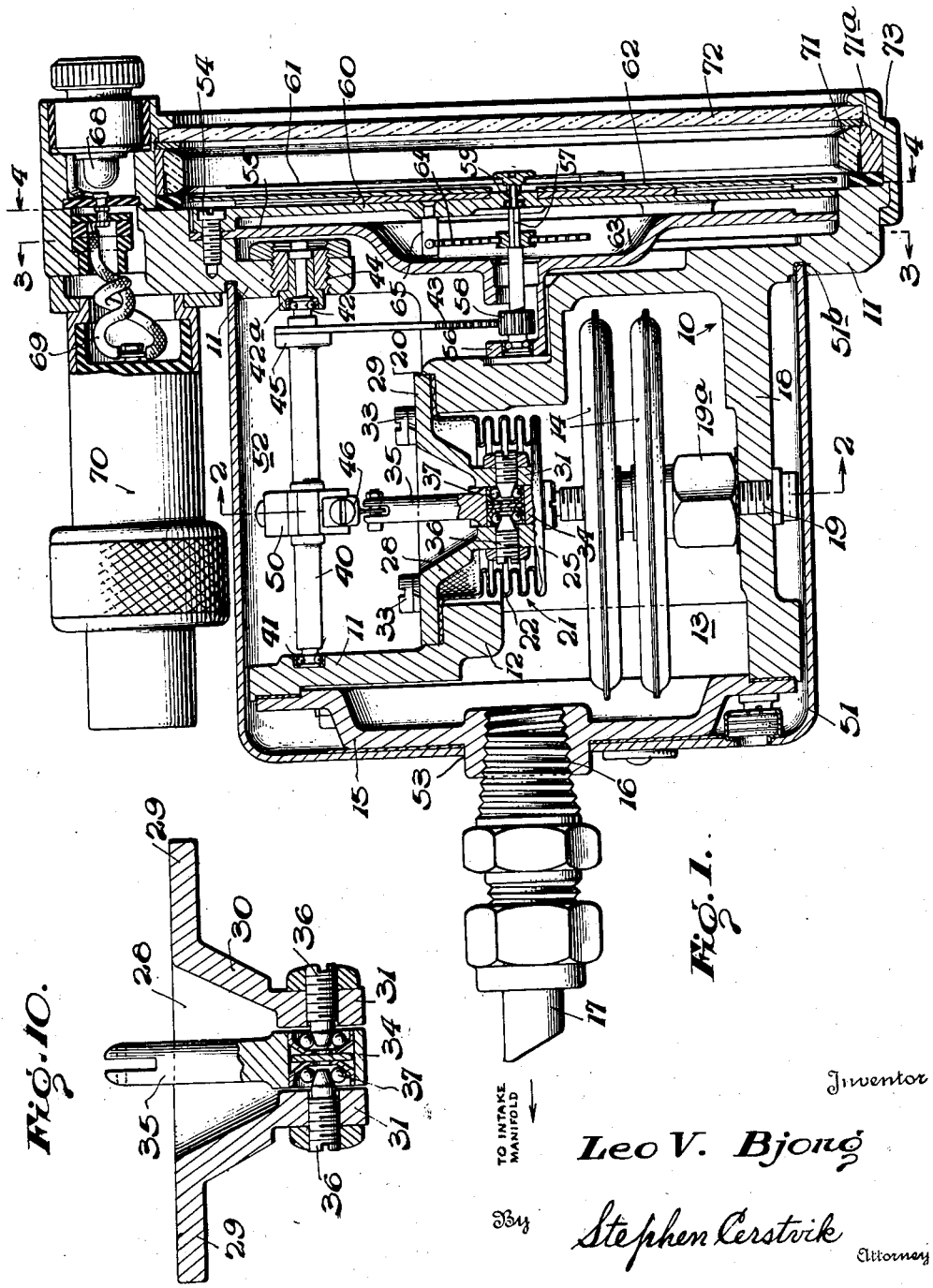

Oct. 28, 1941.  L. V. BJONG  2,260,766
VAPORPROOF MANIFOLD PRESSURE GAUGE
Filed Sept. 6, 1939  5 Sheets-Sheet 1

Oct. 28, 1941.   L. V. BJONG   2,260,766
VAPORPROOF MANIFOLD PRESSURE GAUGE
Filed Sept. 6, 1939   5 Sheets-Sheet 2

Inventor
Leo V. Bjong
By Stephen Cerstvik
Attorney

Oct. 28, 1941. L. V. BJONG 2,260,766
VAPORPROOF MANIFOLD PRESSURE GAUGE
Filed Sept. 6, 1939 5 Sheets-Sheet 3

Inventor
Leo V. Bjong.
By Stephen Cerstvik
Attorney

Oct. 28, 1941.                L. V. BJONG                2,260,766
                  VAPORPROOF MANIFOLD PRESSURE GAUGE
              Filed Sept. 6, 1939            5 Sheets-Sheet 4

Inventor
Leo V. Bjong
By Stephen Cerstvik
Attorney

Oct. 28, 1941.　　　L. V. BJONG　　　2,260,766
VAPORPROOF MANIFOLD PRESSURE GAUGE
Filed Sept. 6, 1939　　　5 Sheets-Sheet 5
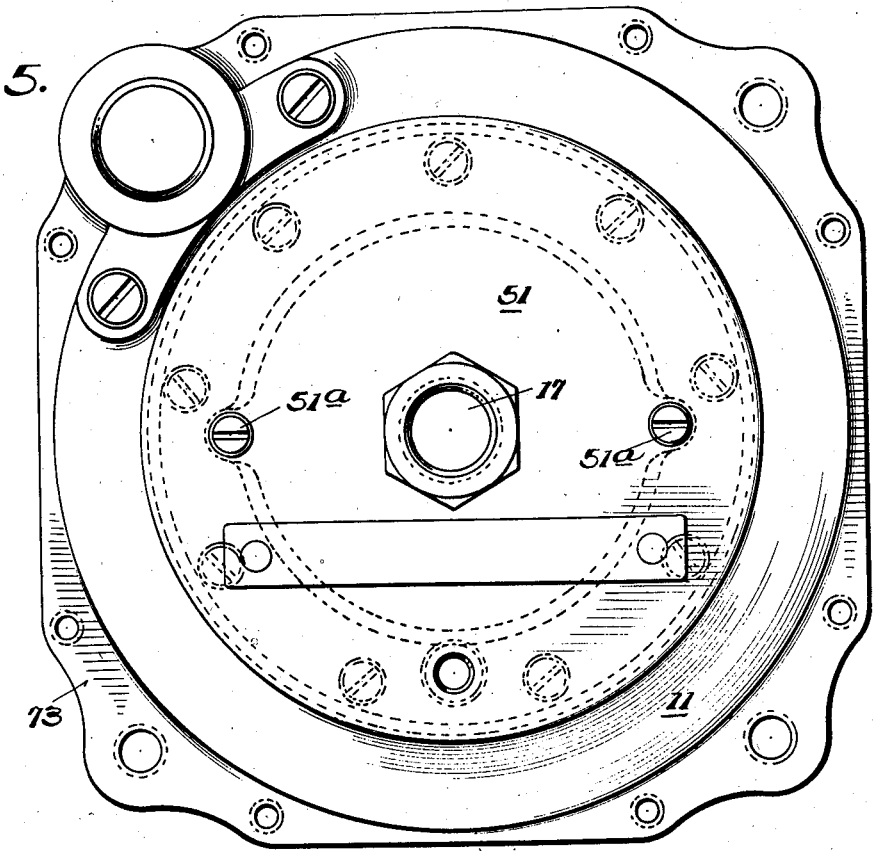
Fig. 5.
Fig. 7.
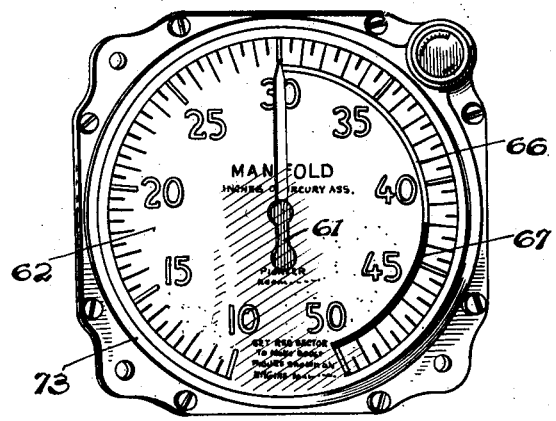
Inventor
Leo V. Bjong.
By Stephen Cerstvik
Attorney Patented Oct. 28, 1941

2,260,766

UNITED STATES PATENT OFFICE 2,260,766

VAPORPROOF MANIFOLD PRESSURE GAUGE

Leo Victor Bjong, Wood-Ridge, N. J., assignor to Bendix Aviation Corporation, South Bend, Ind., a corporation of Delaware Application September 6, 1939, Serial No. 293,627

7 Claims. (Cl. 73—110)

This invention relates to pressure responsive indicating instruments and the like, and more particularly to those adapted for use in aircraft.

Pressure responsive indicating instruments, such, for example, as manifold pressure gauges and differential fuel pressure gauges, hitherto, have been employed wherein the gauge mechanism itself has been exposed to the direct pressures of the manifold or the fuel pressure lines.

As is well known, the manifold pressures being measured often contain fluids other than a true gas as, for example, gasoline, oil, and water vapors. Intermingling and contact of these foreign vapors tends to produce deleterious effects upon the mechanism, causing corrosion thereof and consequent inaccuracy of the indicator. Further than that, discoloration of the dial will take place and obscure the same, making proper reading thereof difficult if not impossible.

A further disadvantage of gauges of the above type has been that leakage often occurs through the closed portions of the casing and thus an error is introduced and correct indication is negatived because of changing pressures due to varying altitudes. Such disadvantages hold for differential fuel pressure gauges as well.

It is among the objects of this invention to overcome these disadvantages and, further, to provide a dependable and accurate, small and light pressure responsive instrument having parts readily accessible to the operator.

The present invention has for its purpose to provide a vapor or moisture-proof pressure responsive indicating instrument such as a manifold gauge or differential fuel pressure gauge whose motion transmitting mechanism will not come in contact with the vapor or moisture existing in the manifold or fuel lines. Preferably, isolated chambers are provided which are sealed from one another. Such seal is effective to permit full introduction and action of the manifold or other pressures to the instrument and leaving the indicating mechanism free of any undesirable contact with the generated engine gases, pressures, or vapors.

Another object of this invention is to provide a novel pressure responsive indicating instrument having isolated chambers with a seal which will prevent passage of undesirable vapors to the operating mechanism of the instrument.

Another object of the invention is to provide a novel pressure responsive indicating gauge having a pressure responsive chamber and a protective chamber for the operating mechanism, with a bellows-type seal therebetween which has the further function of preventing any introduction of atmospheric pressures to the pressure responsive chamber.

A further object of the invention is to provide a chamber containing an aneroid diaphragm sealed from the indicating mechanism and completely isolating pressure vapors in the chamber.

A still further object of the invention is to provide a novel pressure gauge having a plurality of chambers so arranged that no differential pressure exists between the inside and the outside of the outer casing or across the cover glass.

Another object of the invention is to provide in a pressure indicating gauge a protective casing for the indicating mechanism whereby all dust, vapors, and condensed moistures are excluded therefrom.

A still further object of the invention is to provide a novel pressure gauge having a pressure chamber, a mechanism chamber and a sealing member between the two chambers for sealing them and for transferring changes in conditions within the pressure chamber through the seal member to a shaft in a novel manner so that the shaft may be coupled in any known manner to reproduce the effect of the changes in conditions.

Another object of the invention is to provide a novel pressure gauge having a pressure chamber and an indicating mechanism chamber arranged so that no undesirable vapors entering the pressure chamber can communicate with the mechanism chamber. A vented aneroid diaphragm may be provided, if desired, and the interior of the diaphragm can be connected to the pumping side of a fuel line. With this arrangement the interior of the pressure chamber will communicate with the auxiliary pressure side of the fuel line and the consequent operation of the diaphragm will indicate the fuel pressure.

The above and further objects and novel features of the invention will more fully appear from the following detail description when the same is read in connection with the accompanying drawings. It is to be expressly understood, however, that the drawings are for purposes of illustration only and are not intended as a definition of the limits of the invention, reference being had for this purpose to the appended claims.

Figure 2:
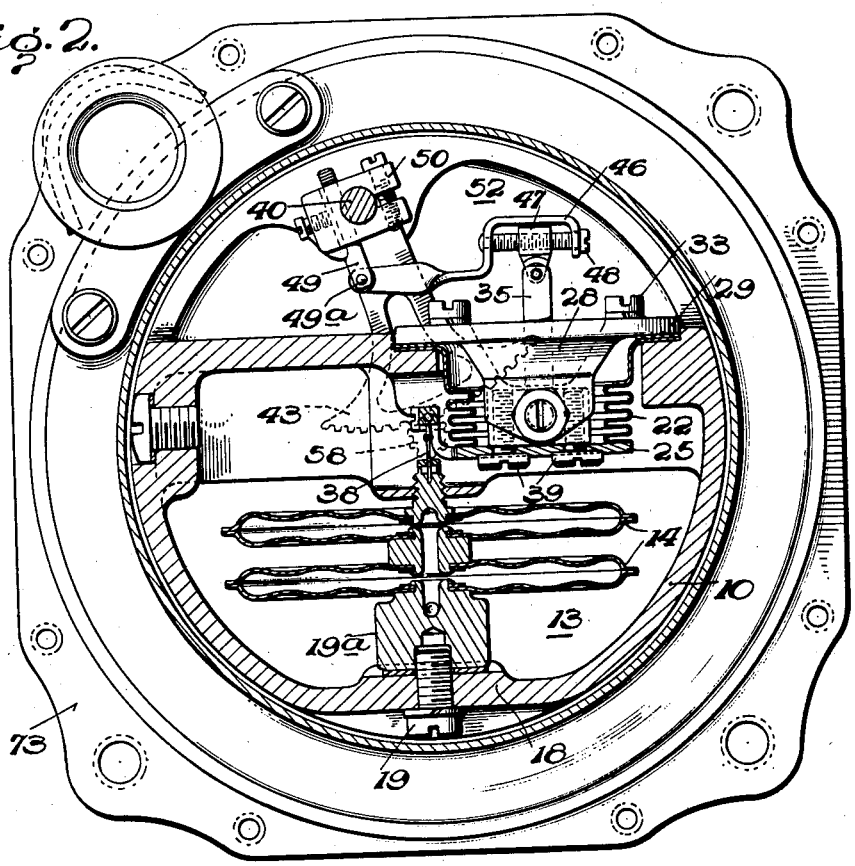
Figure 11:
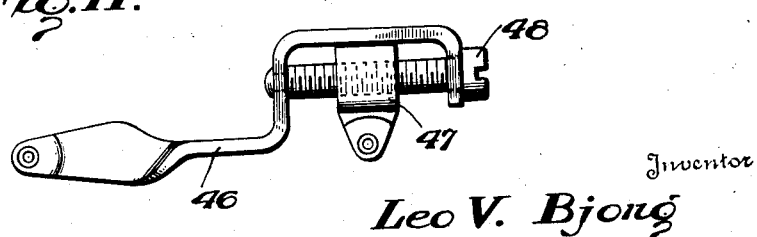
Figure 3:
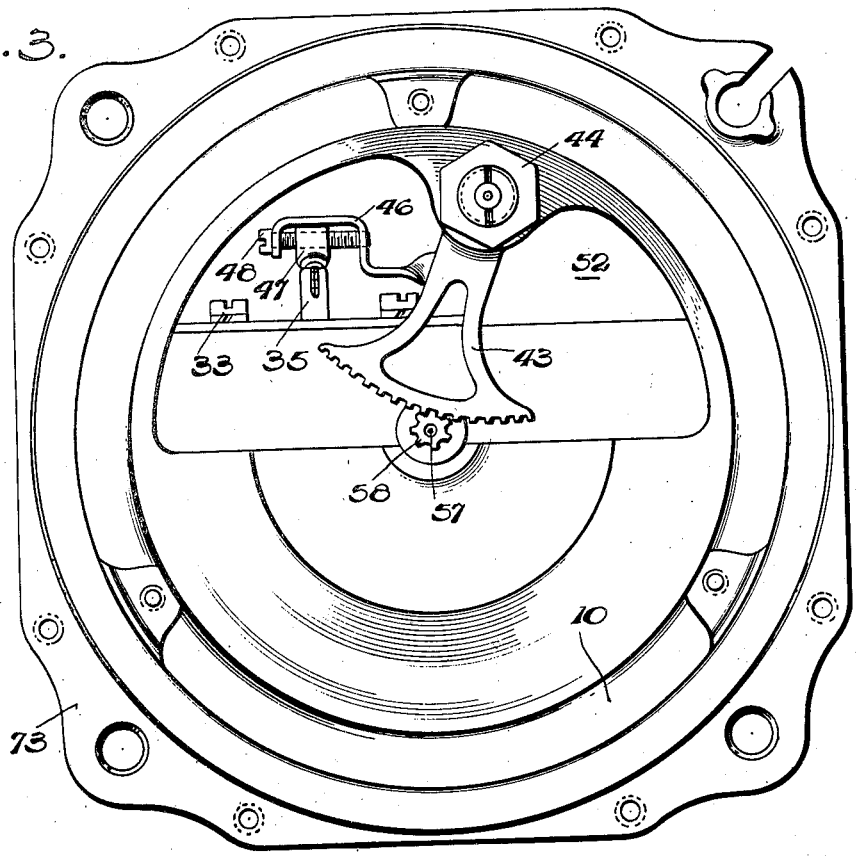
Figure 6:
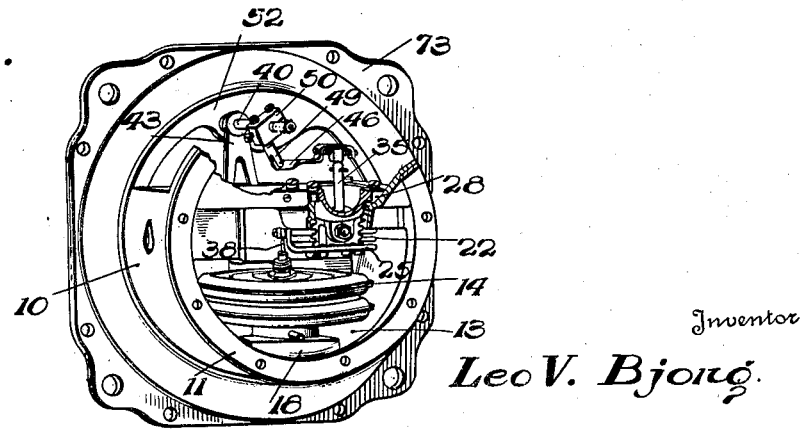
Figure 4:
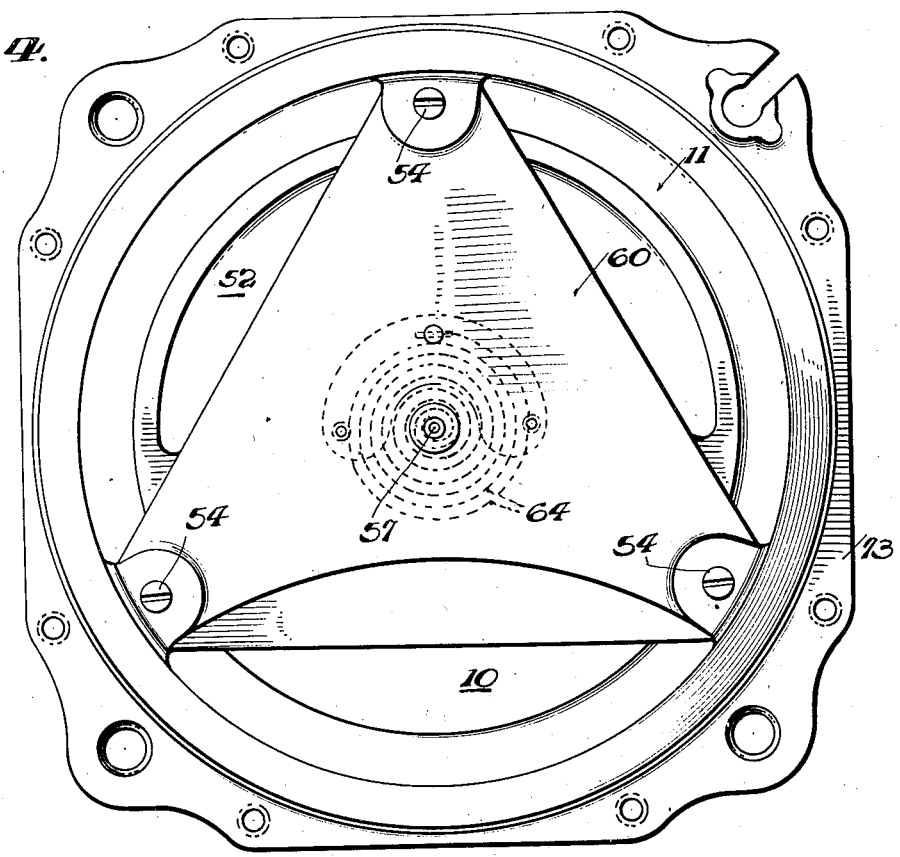
Figure 8:
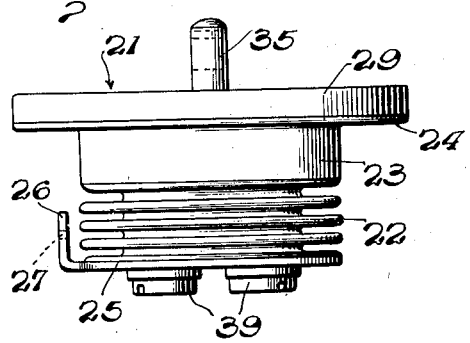
Figure 9:
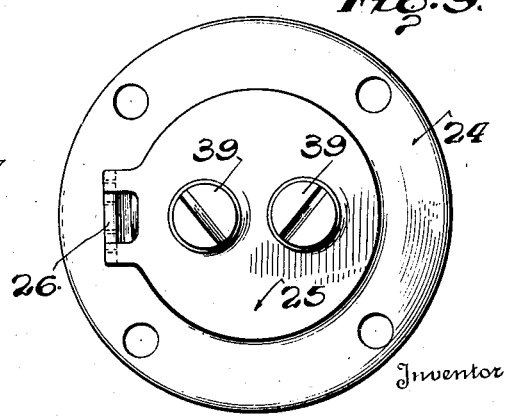

In the drawings, wherein like reference characters refer to like parts throughout the several views:

Fig. 1 is a side elevation, in section, of one form of a pressure responsive indicating instrument embodying the invention;

Fig. 2 is a section taken on line 2—2 of Fig. 1;
Fig. 3 is a section taken substantially along line 3—3 of Fig. 1;
Fig. 4 is a section taken substantially along line 4—4 of Fig. 1;
Fig. 5 is a rear elevational end view of Fig. 1;
Fig. 6 is a perspective view of the instrument with parts broken away and having its rear plate removed;
Fig. 7 is a front end view of the instrument on a reduced scale, illustrating the visible dial;
Fig. 8 is a side elevational view of the novel bellows seal used with the instrument;
Fig. 9 is an end elevational view of the bellows seal of Fig. 8;
Fig. 10 is a side elevation, in section, of the device of Fig. 8, with the outside bellows removed; and
Fig. 11 is a side elevational view of the adjustable connecting link.

A problem arising with the old type of pressure gauges has been the deterioration and corrosion of the motion transmitting means and indicating mechanism due to the direct contact of manifold vapors, moisture, and dust with the mechanism. The present invention contemplates the provision of separate sealed chambers so as to isolate the manifold pressures or fuel pressures and the delicate indicating mechanism from each other without interfering in any way with the transmission of motion from the pressure chamber to the chamber containing the mechanism. Novel motion transmitting means are further provided in the form of a metallic bellows seal for preventing any undesirable leakage of vapors from one chamber to the other. The effect of varying conditions within the pressure chamber is such as to transmit the motion to a controlling member or indicator. Where the instrument is to be used as a differential fuel pressure indicator, the diaphragm in the pressure chamber will respond to fuel pump pressures at its interior and the supercharger or auxiliary pressure will communicate with the outside of the diaphragm. The difference in pressures will actuate the diaphragm and such movement is transmitted to an indicating member.

In the general form of my invention the instrument is usually arranged upon an instrument board and connected by a conduit or other suitable means to the source of pressure to be measured, as, for example, to the intake manifold of an engine. If desired, filtration may be further provided for in the conduit connecting the manifold and the pressure chamber of the gauge.

Referring now more particularly to the drawings for a detailed description of one embodiment of the invention, Fig. 1 illustrates, by way of example, a manifold pressure gauge having an inner casing 10 provided with circular end flanges 11 and a substantially semi-spherical intermediate portion 12. The intermediate portion is closed at its top end to form a variable pressure chamber 13 containing the pressure responsive diaphragm device 14 which in the present embodiment is shown as a pair of aneroid capsules providing evacuated sealed chambers. The hollow rear flange 11 of the casing is pressure sealed by means of a circular back plate 15 and the latter is provided with a boss having a threaded opening 16 adapted to receive the conduit 17 communicating with the manifold intake of an engine (not shown) in any well-known manner. As will readily appear, pressure conditions of the engine are thus transferred to the variable pressure chamber 13. The bottom of the casing 10 is provided with a flat portion 18 forming a base for the diaphragm device 14, the latter being rigidly secured to the base by means such as a screw 19 and stud 19a.

The closed top portion of the casing 10 is formed with an opening 20 adapted to receive the novel metallic bellows seal, indicated generally at 21, for preventing passages of pressures from or into the pressure chamber 13. The seal comprises a metallic bellows 22 (see Fig. 8), having an upward extension 23 pressed outwardly at its end surface to form a flange 24 constituting a bellows adapter, as better shown in Fig. 8. The bottom of the bellows has rigidly secured thereto, or if desired, formed integrally therewith, a bellows yoke 25 having an upturned extension 26 at its outer periphery provided with openings 27.

Inserted within the opening 20 of the casing 10 is a supporting member 28 having an outwardly extending flange 29 forming a pivot support plate and provided with a depending conical portion 30 and downwardly extending arms 31 (see Fig. 10). The bellows 22 and the supporting member 28 form a metallic bellows seal assembly and the latter is secured within the opening 20 by having the flange 29 of the member 28 and the flange 24 of bellows 22 rigidly secured to the abutment formed about opening 20 by suitable means such as screws 33. A bearing block 34 having an extending bifurcated stem or bellows arm 35 formed integrally therewith is arranged between the arms 31 of the supporting member 28 and is journalled for pivotal movement upon adjustable pivots 36 screw-threadedly carried by the arms. A more efficient pivotal movement of block 34 and the stem 35 is obtained by the further provision of ball bearings 37 mounted in a cage placed within the bearing block. The pivots 36 are adjusted so as to prevent any side motion on the part of the shaft 35 and cause the latter to travel in a plane of rotation perpendicular to the rock-shaft 40. The side portions of arms 31 are bevelled so as to permit unrestrained pivotal movement on the part of the bearing block 34.

A flexible tension member 38, (see Fig. 2) is rigidly secured at its one end to the aneroid diaphragm 14 and at its free end to the upturned extension 26 of the bellows yoke 25. The bearing block 34 is rigidly secured to the bellows yoke 25 by means such as screws 39 so that reciprocating motion of the diaphragm 14 due to variation in pressure in the chamber reciprocates the tension member 38 and causes pivotal movement of the bellows yoke 25 and the block 34, compressing one side or the other of the bellows, and rocking the stem 35. The bellows yoke 25, bearing block 34 and stem 35 constitute a yoke arm actuated by the movement of the diaphragm and adapted to transmit the movement to an indicating mechanism to be more fully described hereinafter.

Mounted upon the inner surfaces of the circular end flanges 11 of the inner casing 10 is a rock-shaft 40 journalled for rotation in the bearings 41 and 42 and having secured thereto a gear sector 43 at one end. The shaft 40, at a point nearest the gear sector 43, is provided with an adjustable bolt 44 adapted to compensate for end play of shaft 40. An adjustable member 42a is provided within the bolt 44 and rotation thereof will result in more accurate meshing of the sector gear 43 with pinion 58 by means of the eccentric bushing defined by the bolt 44 and the adjustable member 42a.

Interconnecting the rock-shaft 40 and the bifurcated stem or arm 35 is an adjustable connecting link 46. The connecting link is provided, (as shown in Fig. 11) with a rider 47 secured at one end to stem 35 and having a screw-threaded opening longitudinally thereof for the adjusting bolt 48. The rotation of the bolt 48 in one direction or the other lengthens or shortens the effective length of the connecting link 46 and thus provides an accessible adjusting means without disturbing the pressure chamber itself. A rocker arm 49 is adjustably mounted in a block 50 for adjustment about the rock-shaft 40, and is pivotally connected at its free end with the free end of the connecting link 46, as shown at 49a.

It will be readily seen, therefore, that motion due to contraction or expansion of the diaphragm device 14 will cause resultant motion on the part of the flexible tension member 38 which rocks the bellows yoke 25 and block 34 about pivots 36. This motion is transferred to the rock-shaft 40 by way of bellows 22, stem 35, connecting link 46, rock-arm 49, and block 50.

The construction and arrangement of the bellows seal 21 is such that since the forces are applied to the end of the bellows yoke 25 and since the supporting member 28 is rigidly secured to the casing, the extending arms 31 of such member, together with the pivots 36 therein, will form a stationary fulcrum about which the bellows 22 and stem 35 will rock, and any longitudinal movement of the bellows and stem will be prevented. If such provision were not made, changes in atmospheric pressure would cause an additional reaction on the bellows introducing an altitude error. The bellows 22, further, provide a seal-tight fit preventing any passage of gases or moisture from one chamber to the other and thus protect the indicating mechanism.

A cup-shaped outer casing 51 is provided for the instrument and is secured at its open end to the front flange 11 of the inner casing 10 in any suitable manner by means of screws 51a (Fig. 5) which pass through the rear wall of the casing 51 and into plate 15. Thus, casing 51 forms a transmission mechanism chamber 52. The rear wall of the casing 51 is provided with an opening 53 to accommodate the boss of rear plate 15 receiving the conduit 17. The casing 51 is sealed at the flange 11 by a gasket 51b (Fig. 1).

Secured to the front flange of the inner casing by means such as screws 54 is a plate 55 having a concave middle portion with an extension 56 defining a bearing surface for one end of an indicator shaft 57 carrying the pinion 58 meshing with the gear sector 43. The outer end of the indicator shaft 57 is journalled in a bearing 59 formed in a backing face plate 60 and carries the needle 61 at its free end adjacent the dial surface 62. The dial surface may be suitably calibrated as shown in Fig. 7.

A housing 63 is formed between the concave portion of plate 55 and the backing face plate 60 for a spiral spring 64 secured to the indicator shaft at one end and to a stationary stud 65 mounted in or integral with the backing plate 60. The provision of such spring absorbs the undesirable oscillations of the needle 61 due to any backlash of the rotating gears or related parts.

As has been above described, rocking of shaft 40 due to varying conditions within the pressure chamber 13 rocks gear sector 43 and thus rotates indicator shaft 57 by means of pinion 58 against the action of spring 64. The needle 61 rotates about the surface of dial 62 with the indicator shaft 57 responding to pressure conditions of the variable pressure chamber 13.

The instrument may further be provided with adjustable warning sectors on its dial. A yellow sector 66 may be provided for the high boost operating range and a red sector 67 for the high or beyond maximum range.

A ring-light arrangement of the type shown in Rylsky Patent No. 2,140,972 is provided for illuminating the face of the dial, the same constituting a removable bulb 68 having leads 69 to a step-down resistor contained in casing 70. A ring 71a of transparent light-conducting material is so constructed as to distribute light evenly upon the surface of the dial with the aid of another transparent ring 71. The assembly may be in the form of a bezel ring 73 and carrying therewith the cover glass 72. The bezel ring may be secured to the front end of the casing 10 in any suitable manner.

From a detailed description of the construction, it will now readily appear that the instrument may be put to various uses. The instrument is particularly adapted to be used as a manifold pressure gauge or a differential fuel pressure gauge. In the former case, manifold pressures communicate with the interior of the pressure chamber by means of conduit 17 and the variation of intake pressure acts upon the aneroid 14 which transmits motion to the indicating mechanism.

If the instrument is to be utilized as a differential fuel pressure indicator, the interior of the diaphragm device 14 may be connected to the fuel pump side of the line by means of a conduit. The conduit 17 is then subject to the booster pressure side of the line and this pressure acting within the chamber 13 upon the diaphragm 14 in conjunction with the fuel pump pressure within the diaphragm will cause movement of the latter. Such movement of the diaphragm responds to the difference of the pressures and this movement is then transmitted, as above described, by the diaphragm to the rock-shaft 40 and indicator 61 to indicate the fuel pressure.

The provision of the assembly above described increases the efficiency and length of service of the pressure gauge. The novel arrangement of the isolated chambers connected by the bellows seal not only prevents passage of undesirable vapors to the delicate motion transmitting mechanism embodied in one chamber but also positively prevents any changes of atmospheric pressure to be communicated to the pressure or working chamber. The latter provision is further desirable as the pressures within the mechanism chamber and on the outside of the cover glass are balanced and this avoids any danger to the pilot as was the case with the old type of gauge. The transmission of motion from the pressure chamber is in no way hindered by the metallic bellows and the latter does not affect the efficiency and accuracy of the instrument. The provision of the ball bearings for the yoke arm renders a practically frictionless pivot and consequently the true change in the pressure chamber is reproduced by the indicating mechanism. As has been above noted, the arrangement is adapted, by proper mounting and suitable connections, to be used, for example, as a manifold pressure gauge, a differential fuel pressure gauge, and any other suitable instrument used to measure varying pressures and at the same time isolate the latter from the transmission mechanism itself.

Although only one embodiment of the invention has been illustrated and described, various changes and modifications in the form, materials, and the relative arrangement of parts, which will now appear to those skilled in the art, may be made without departing from the scope of the invention. Reference is, therefore, to be had to the appended claims for a definition of the limits of the invention.

What is claimed is:

1. A manifold pressure gauge comprising a flanged housing defining a chamber subjected to variable pressures and having an opening in a portion thereof, an evacuated expansible diaphragm device mounted in said pressure chamber, indicating means interior of said pressure chamber, a flexible bellows in said pressure chamber having a sealed end and an open end provided with a flange, a conical member provided with a flanged portion for securing said bellows flange to said housing about the opening thereof, a rocking member within said conical member and operatively connected with said indicating means, said conical member having depending arms contacting the sealed end of said bellows defining a pivot for said rocking member, means connecting one edge of said bellows for movement with said diaphragm whereby said rocking member is operated to actuate said indicating means in accordance with the pressure variation in said pressure chamber, and a casing enclosing said housing in abutting relation with the flange thereof.

2. A manifold pressure gauge comprising a housing defining a chamber subjected to variable pressures and having an opening in a portion thereof, an expansible diaphragm mounted in said chamber, a flexible bellows in said pressure chamber comprising a seal between the pressure chamber and the exterior of said housing, a conical member provided with a flanged portion for securing one end of said bellows to said housing about the opening thereof, indicating means exterior of said pressure chamber, a rocking member within said conical member operatively connected with said bellows and said indicating means, said conical member having means defining a pivot for said rocking member, means connecting one edge of said bellows for movement with said diaphragm whereby said rocking member is operated to actuate said indicating means in accordance with the pressure variation in said pressure chamber, a casing enclosing said housing, a frame attached to the front of said housing and carrying a cover glass through which said indicating means are visible, and means on said frame for mounting the gauge on an instrument panel.

3. A manifold pressure gauge comprising a housing defining a chamber subjected to variable pressure and having an opening in a portion thereof, an expansible diaphragm mounted in said chamber, a flexible bellows in said pressure chamber comprising a seal between the pressure chamber and the exterior of said housing, a conical member provided with a flange for securing one end of said bellows to said housing about the opening thereof, indicating means exterior of said pressure chamber, rocking means pivotally mounted within said conical member and operatively connected with said bellows and said indicating means, means connecting one edge of said bellows for movement with said diaphragm whereby said rocking means is operated to actuate said indicating means in accordance with the pressure variation in said pressure chamber, the pivotally mounted rocking means preventing longitudinal expansion and contraction of said bellows due to atmospheric pressure variation in said housing, a casing enclosing the rear portion of said housing, a frame attached to the front of said housing and carrying a cover glass enclosing said indicating means but permitting observation thereof, and means on said frame for mounting the gauge on an instrument panel.

4. A pressure gauge comprising a housing defining a chamber subjected to variable pressure and having an opening in a portion thereof, an expansible diaphragm mounted in said chamber, a flexible bellows in said pressure chamber comprising a seal between the pressure chamber and the exterior of said housing, a conical member provided with a flange for securing one end of said bellows to said housing about the opening thereof, indicating means exterior of said pressure chamber, a rocking member within said conical member operatively connected with said bellows and said indicating means, flexible tension means connecting one edge of said bellows for movement with said diaphragm whereby said rocking member is operated to actuate said indicating means in accordance with changes in pressure in said pressure chamber, and a casing enclosing said housing.

5. A vaporproof manifold pressure gauge comprising a housing provided with a front flange and a rear flange and having a substantially flat portion between said flanges, said housing forming a pressure chamber having a rear opening surrounded by said rear flange and a second relatively smaller opening in said flat portion, a cover closing said rear opening and forming an air-tight seal but having means for connecting said chamber to a source of pressure, an evacuated expansible diaphragm device mounted in said pressure chamber for expansion and contraction in accordance with pressure changes in said chamber, a rocking shaft pivotally mounted on said housing across said flat top portion, indicating means at said front flange connected for actuation by said rocking shaft, a cup-shaped flexible bellows having its closed end extending into said pressure chamber through the opening in said flat portion and its open end provided with a flange surrounding said opening, a conical member extending into said bellows and having a flange coinciding with said bellows flange for securing the latter to said housing about said opening to form an air-tight seal, a connecting member pivoted in said conical member and having one end connected to the closed end of said bellows and the other end connected to said rocking shaft, said connecting member preventing expansion and contraction of said bellows while permitting rocking movement of the closed end thereof, and means connecting the closed end of said bellows to said diaphragm device for rocking movement by the latter to actuate said rocking shaft through said pivoted connecting member.

6. In a pressure gauge for an engine having an intake manifold, a chamber subjected to varying pressures, expansible means within said chamber, a conduit for interconnecting said intake manifold with said pressure chamber, an indicator shaft, a casing surrounding said indicator shaft and said pressure chamber, a flexible tension member mounted for reciprocal movement with said expansible means in response to changing pressures in said chamber, a flexible bellows comprising a seal between said pressure chamber and said casing mounted for rocking movement about its central longitudinal axis and connected at an outer portion thereof with said flexible tension member for movement thereby, means comprising a member mounted in said bellows for rocking movement therewith in said casing, and means exterior of said pressure chamber comprising a rocker arm interconnecting said rocking member and said indicator shaft to indicate pressure variation.

7. In a pressure responsive device for an engine having an intake manifold, a chamber subjected to varying pressures, expansible means within said chamber, a conduit for interconnecting said intake manifold with said pressure chamber, an operating shaft, a casing surrounding said operating shaft and said pressure chamber, a flexible tension member mounted for reciprocal movement with said expansible means in response to changing pressures in said chamber, a flexible bellows comprising a seal between said pressure chamber and said casing mounted for rocking movement about its central longitudinal axis and connected at an outer portion thereof with said flexible tension member for movement thereby, means comprising an arm mounted in said bellows for rocking movement therewith in said casing, and means exterior of said pressure chamber comprising a rocker arm interconnecting said rocking arm and said operating shaft to operate the latter in accordance with the pressure variation in said chamber.

LEO VICTOR BJONG.